(12) United States Patent
Bijawat et al.

(10) Patent No.: US 6,211,662 B1
(45) Date of Patent: Apr. 3, 2001

(54) HAND-HELD HIDDEN OBJECT SENSOR FOR SENSING A LOCATION OF OBJECTS HIDDEN BEHIND A SURFACE OF AN ARCHITECTURAL STRUCTURE

(75) Inventors: Viresh Bijawat; David L. Wakefield, both of North Haven; Russell H. Powers, Newington, all of CT (US); Ronald Yim, Hong Kong (HK)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 09/130,471

(22) Filed: Aug. 7, 1998

(51) Int. Cl.[7] .................................................. G01R 19/00
(52) U.S. Cl. .............................. 324/67; 324/202; 324/326
(58) Field of Search .............................. 324/67, 202, 326, 324/327, 329, 601, 658, 662, 663, 671, 686, 690; 340/551, 562; 361/179–181

(56) References Cited

U.S. PATENT DOCUMENTS

| | | | |
|---|---|---|---|
| 4,464,622 | 8/1984 | Franklin | 324/67 |
| 4,476,430 | 10/1984 | Wright et al. | 324/671 |
| 4,853,617 | 8/1989 | Douglas et al. | 324/67 |
| 4,859,931 | 8/1989 | Yamashita et al. | 324/67 |
| 4,860,232 | 8/1989 | Lee et al. | 364/571.04 |
| 4,992,741 | 2/1991 | Douglas et al. | 324/671 |
| 5,148,108 | 9/1992 | Dufour | 324/226 |
| 5,296,806 | 3/1994 | Hurl, Jr. | 324/214 |
| 5,315,884 | 5/1994 | Kronberg | 73/862.68 |
| 5,352,974 | 10/1994 | Heger | 324/67 |
| 5,373,235 | 12/1994 | Clark, Jr. et al. | 324/207.16 |
| 5,438,266 | 8/1995 | Tsang | 324/326 |
| 5,457,394 | 10/1995 | McEwan | 324/642 |
| 5,543,799 | 8/1996 | Heger | 342/85 |
| 5,619,128 | 4/1997 | Heger | 324/67 |
| 5,754,049 | 5/1998 | Howell | 324/326 |

*Primary Examiner*—Jay Patidar
(74) *Attorney, Agent, or Firm*—Pillsbury Winthrop LLP

(57) ABSTRACT

A hidden object sensor is described which senses and locates hidden objects hidden behind a surface of an architectural structure. The sensor includes sensing elements for sensing live wires behind the accessible surface, and separate sensing elements for respectively sensing metal and non-metallic objects behind the tested surface. A microprocessor alternates between the use of the various sensing elements and their associated circuits to detect live wires, metal objects, or wood studs. Visible and audible indicators are provided for indicating the device's mode of operation and the locations of sensed hidden objects. If a live wire is sensed, the processor may preclude an indication of a metal object or wood stud.

14 Claims, 5 Drawing Sheets

HAND-HELD HIDDEN OBJECT SENSOR FOR SENSING A LOCATION OF OBJECTS HIDDEN BEHIND A SURFACE OF AN ARCHITECTURAL STRUCTURE

FIELD OF THE INVENTION

The present invention is related to devices that will sense for and locate objects hidden behind accessible surfaces, such as walls, ceilings, and floors, of architectural structures.

DESCRIPTION OF BACKGROUND INFORMATION

There are several types of existing sensing devices for sensing and locating objects behind walls and other building surfaces. For example, U.S. Pat. No. 4,859,931 (Yamashita et al.) discloses an electronic detector comprising both a capacitive sensor and a magnetic field sensor. The capacitive sensor is provided to locate non-metallic objects behind a wall surface, and the magnetic field sensor is provided to locate metallic objects behind a wall surface. U.S. Pat. No. 5,438,266 (Tsang) discloses an instrument for locating buried conductors. The instrument utilizes a signal generator and a coil having a substantially vertical axis coil attuned to pick up odd and even harmonics of a fundamental frequency of a periodic test current, thereby allowing the accurate location of buried conductors. U.S. Pat. Nos. 5,352,974 and 5,619,128 (both to Heger) each disclose stud sensors which utilize capacitive sensors for locating studs hidden behind a wall or other structural surface.

Zircon Corporation markets a multifaceted stud finder device called the VideoScanner™ 5.0 Model No. 54014. This device detects wood, metal, and live electrical wires hidden behind walls, floors and ceilings having conventional cross-sections. The device has normal and deep scan settings in one mode and a metal setting in another mode. Thus, the device can be set to scan for studs using a normal or deep scan setting, or it can be set to scan for metal objects. With either mode—the normal/deep scan settings or the metal setting, the device is first calibrated. To calibrate the device for sensing hidden objects, the activation switch is pressed and held down, and a ready indicator will appear on an LCD once the device has been calibrated. The activation switch is held down during scanning of the device along the applicable surface. Once the device is calibrated, it may be scanned to locate hidden objects such as wood or metal studs in the normal and deep scan settings, or metal objects in the metal setting. The device is further provided with a portion which allows continuous AC voltage detection. It will detect either 110 or 220 volts AC present in a live electrical wire hidden behind the applicable building surface. Once the voltage has been detected, the device will display a flashing voltage icon.

SUMMARY OF THE INVENTION

The present invention is provided to improve upon devices for sensing and locating objects hidden behind structural surfaces, such as hand-held stud finding devices. An object of the present invention is to provide such a sensing device that will continuously sense for and locate both wooden and metal wall studs hidden behind wall and other structural surfaces made of such materials as plaster board. Another object of the present invention is to provide such a sensing device that will further locate metal rebars in concrete walls. Yet another object is to provide a sensing device which automatically increases sensitivity during calibration to most accurately sense and locate metal bars that are located behind the accessible surface.

A further object of the present invention is to provide a hidden object sensing and locating device that can locate live wiring behind accessible wall and other structural surfaces, where such surfaces are formed by materials such as plaster board or concrete. A further object of the present invention is to provide a wall stud sensing device with a convenient marking mechanism for marking on the applicable surface one or more spots that coincide with and indicate the position and dimensions of an object hidden behind the surface. Yet another object of the present invention is to provide a wall stud sensing device which utilizes an intelligent hierarchical approach to simplify the operation of the device in detecting and locating (and distinguishing between) live wires, metal objects, and nonmetallic objects.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the invention throughout the several views, and wherein.

DETAILED DESCRIPTION OF THE EXEMPLARY EMBODIMENT

Figure 1A:
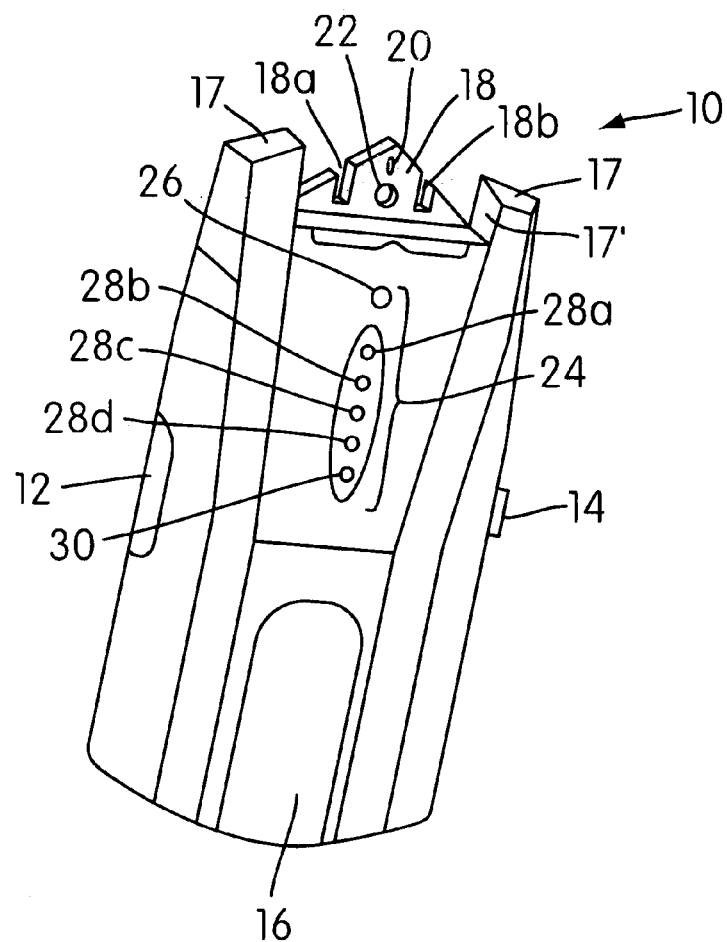
FIG. 1A is a perspective view of a hidden object sensor in accordance with an embodiment of the present invention.

The present invention is directed to a hidden object sensor for sensing and locating objects hidden behind an accessible surface of an architectural structure, such as a wall, ceiling, or floor surface of a dwelling or other type of building. Referring now to the drawings in greater detail, FIG. 1 illustrates in a perspective view, an exemplary embodiment of a hidden object sensor 10 comprising a back surface (see FIG. 1D) which is substantially planar, and a top surface having a generally convex cross-section. The illustrated sensor 10 comprises on its left side an on-off switch 12 and on its right side, a live wire switch 14. A belt clip 16 is provided at one end on the top side of sensor 10. A plurality of LEDs 24 are arranged along a common axis flush with the outer surface of the illustrated sensor 10 and in line with its longitudinal axis. Sensor 10 has a resilient but flexible marker member 18 provided at an end opposite belt clip 16. Resilient marker member 18 comprises a pencil hole 22 and is formed in the shape of a triangle comprising an apex that coincides with the central longitudinal axis of sensor 10. Rectangular recesses 18a, 18b extend downward from each sloped edge of the triangular-shaped resilient marker member 18 in a direction parallel to the longitudinal axis of sensor 10. Recesses 18a, 18b add to the flexibility of a central portion of resilient marker member 18, and further assist in targeting a specific location identified by sensor 10 along the structural surface being scanned.

Figure 1B:
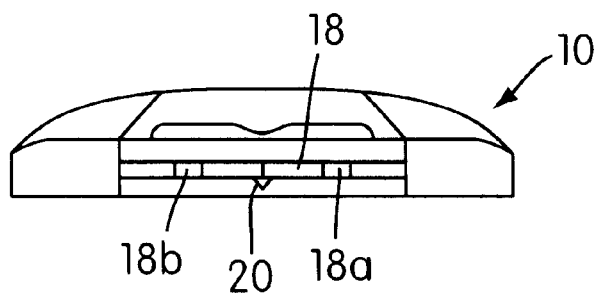
FIG. 1B is an end view of the illustrated sensor.

A pin marker 20 is centered within the central portion of resilient marker member 18, and thus also coincides with the longitudinal axis of sensor 10. Pin marker 20 may comprise, for example, a sharp apex protruding from the bottom planar surface of resilient marker member 18 and thus facing toward the surface to be scanned. The user can use a free finger such as the index finger to press down on the central portion of resilient marker member 18 to cause the sharp apex of pin marker 20 to create a hole within the structural surface, thereby identifying the position of a located object hidden behind the structural surface. The sharp apex of pin marker 20 may comprise an integral part of resilient marker member 18 which may be formed, for example, using a press molding technique. Resilient marker member 18 may, for example, be formed from a sheet of tin or brass alloy, or, in the alternative, it may comprise a piece of fiber-reinforced molded plastic. In any event, resilient marker member 18 should be of a material that is resilient yet sufficiently flexible to allow a user to press pin marker 20 into the scanned surface with little effort. It should continue to return to its original position even after repeated flexing of the central portion of resilient marker member 18. Note that when the central portion of resilient marker member 18 is in its non-flexed position as shown in FIG. 1B, the apex of pin marker 20 will be spaced from the scanned surface, as is evident in FIG. 1B.

A plurality of LEDs (visible indicators) are positioned in tandem in line with the longitudinal axis of the illustrated sensor. They comprise a yellow metal-only detection mode indication LED 26, a red edge indication red LED 28*a*, plural red graduating red LEDs 28*b*—28*d*, and a green ready indication LED 30. The hidden object sensor 10 in the embodiment illustrated in FIGS. 1*a*–4 uses electronic signals to identify and precisely locate the positions of studs, joists, metal or live AC wires hidden behind structural surfaces formed by drywall, concrete, and other common building materials. Once the edge of a hidden object has been detected, sensor 10 provides both audible and visible indications to allow the user to easily pinpoint the center position of the hidden object. The built-in pin marker 20 or pencil hole 22 may be used to easily mark the object position on the wall surface.

Figure 3:
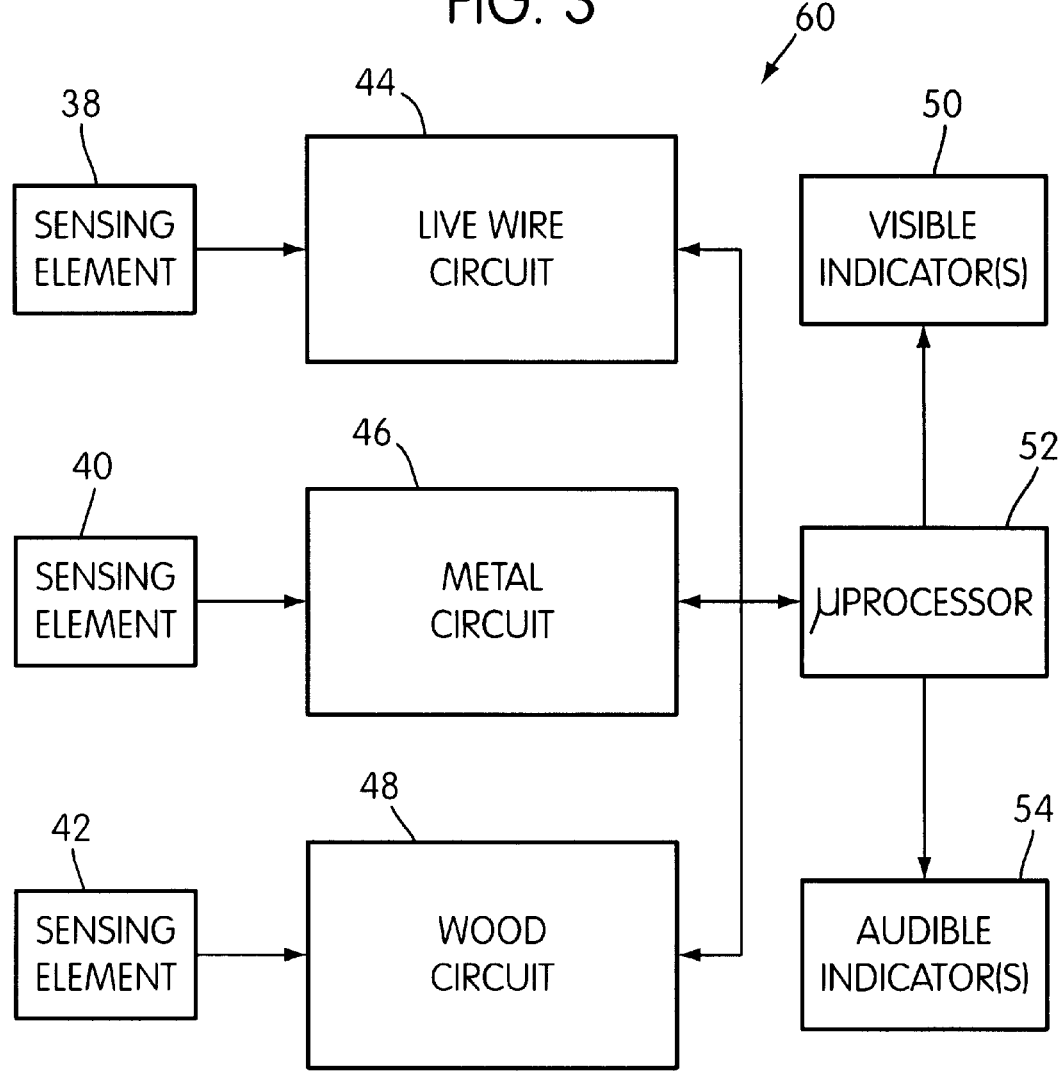
FIG. 3 is a block diagram of the electronic circuitry 60 of the illustrated sensor.

FIG. 3 is a block diagram of electronic circuitry 60 which facilitates the operation of the illustrated hidden object sensor 10. Plural sensing elements 38, 40, and 42 are secured within the housing of sensor 10 so as to be in alignment with the sensor's longitudinal axis for providing information indicative of the type of object hidden behind the applicable building surface and its location. Sensing element 38 is provided for sensing the existence and location of live wires. Sensing element 40 is provided to sense the presence of metal objects behind the surface. Sensing element 42 is provided to sense studs behind the applicable structural surface. By way of example, sensing element 38 may comprise an antenna or other sensing element for responding to electric or magnetic fields which will be present near live wires carrying 110 or 220 volts AC. Sensing element 40 may comprise a magnetic field sensor such as that disclosed in U.S. Pat. No. 4,859,931 (Yamashita et al.). Sensing element 42 may comprise a standard capacitive sensor for sensing hidden studs behind wall and other building surfaces.

Live wire circuit 44 may comprise amplifying circuitry narrowly tuned to coincide with a frequency on the order of 50–60 Hz, and having a threshold voltage level of approximately 90 V, to thereby signal the presence of live wires carrying greater than 90 V and having a frequency of between 50–60 Hz. Metal circuit 46 may comprise circuitry as provided in the metallic object detection section disclosed the Yamashita et al. patent.

Wood circuit 48 may comprise sensing and calibration circuitry such as that disclosed in the Yamashita patent, or as described in other stud sensing devices such as either of the Heger patents (U.S. Pat. No. 5,619,128 and 5,352,974). Each of live wire circuit 44, metal circuit 46, and wood circuit 48 is connected to a microprocessor 52 which executes a process in accordance with the flowchart shown in FIG. 4. Microprocessor 52 is further connected to one or more visible indicators 50 and one or more audible indicators 54. Audible indicator (s) 54 may comprise a speaker (not shown). In the illustrated embodiment, visible indicator (s) 50 comprise LEDs 24 as shown in FIG. 1A.

In operation, the illustrated sensor 10 is first calibrated and then is used to scan a structural surface to identify objects hidden behind that surface. During calibration, the sensor 10 is scanned across the structural surface in a manner similar to when sensor 10 is scanned for purposes of identifying and locating hidden objects. Different calibration processes are executed depending upon whether the unit will be used for detecting and locating wood or metal. Before calibration, live wire detection switch 14 should be put in the "ON" or "OFF" position. However, the user may wish to put the live wire switch 14 in the "ON" position for the desired operation unless the user is sure that there are no live wires present behind the structural surface being scanned.

When calibrating for wood, sensor 10 is firmly held flat against the applicable surface. The user will then depress the "ON-OFF" switch on the left hand side of sensor 10 and release. Sensor 10 must then be held without any movement until the green ready indication LED 30 flashes. Then, the user will sweep sensor 10 across the tested surface in the manner illustrated in FIG. 2 until a long beep is heard and a green ready indication LED 30 remains "ON." At that moment, the unit is calibrated and ready for detection of wooden studs. Sensor 10 will sound three separate beeps if no stud was detected by wood circuit 48, thus indicating that wood circuit 48 could not be calibrated. At that point, wood circuit 48 is shut off, and the "metal-only" yellow indication LED 26 will be illuminated.

When calibrating for the detection of metal objects, sensor 10 is held firmly against the surface to be tested, and the "ON-OFF" switch is pressed and released. Sensor 10 is placed over a location where a metal object is known to exist, and the unit is turned on. When green LED 30 starts to flash, sensor 10 will be set. Metal circuit 46 will set its sensitivity to the necessary depth. It will then only indicate whether a metal object exists at the set depth or closer. The actual depth will vary depending upon the type and size of the metal object being detected.

Figure 2:
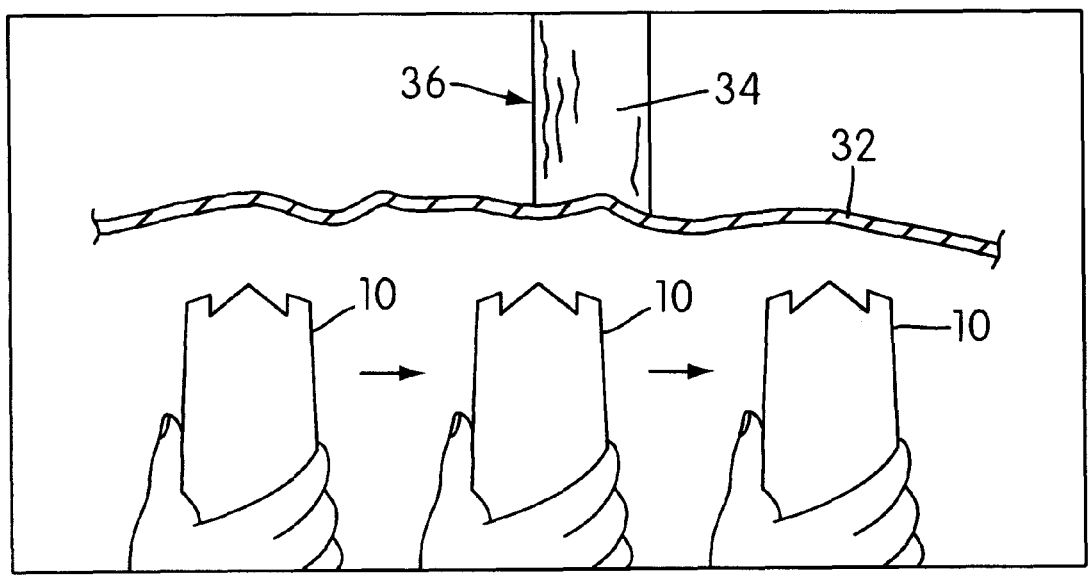
FIG. 2 comprises a view of a wall surface 32 being scanned by a hidden object sensor 10.

Once sensor 10 is calibrated, to detect wood studs, the unit is slid slowly across the surface in a straight line, as shown in FIG. 2. As the unit moves closer to the left edge 36 of wood stud 34 (or to the right edge of wood stud 34 in the situation where the device is being scanned toward the left to detect the right edge) one or more red LEDs 28*a*–28*d* will be illuminated, starting with lower-most red LED 28*d* when sensor 10 is far from left edge 36 and including successive additional ones of LEDs 28*c*–28*a* until the final LED 28*a* is illuminated—thus indicating the coincidence of the center position of sensor 10 with the stud's left edge 36.

The position of left edge 36 will coincide with the position of pencil hole 22 and pin marker 20 of resilient marker member 18. At this point, a pencil or pin marker 20 may be used to mark the position on the wall surface corresponding to edge 36 of stud 34. The dimensions and position of stud 34 should be double-checked by repeating the above steps while sliding sensor 10 from the right side of stud 34, making additional markings indicating the stud's right edge location on the wall surface. The mid point between the two marks will indicate the stud's center.

When detecting for metal objects, the unit is calibrated as described above for metal detection, and the unit is scanned in the same manner described for detecting wood, as shown in FIG. 2, until the red LEDs start to illuminate in the same manner. When an edge of a metal object such as a metal stud or plate is detected, the unit will sound short double beeps and it will flash green LED 30 and steadily illuminate red LEDs 28a–28d signalling the object's location. The edge of the detected metal object may be marked on the wall surface. Sensor 10 may be scanned from the opposite direction, and an additional marking may be made on the wall surface identifying the location of the opposite edge. The mid point between the markings indicates the center point of the detected metal object.

For locating deep metal objects up to a maximum depth allowed by metal circuit 46, metal circuit 46 of sensor 10 may be calibrated by holding sensor 10 away from any wall surface and pressing the "ON-OFF" switch 12 momentarily. The user will then wait until green LED 30 stops flashing, at which point sensor 10 is set for detecting and locating metal objects at a maximum distance from the wall surface, and the wood circuit 48 has been shut off, as indicated by yellow "metal only" LED 26 being illuminated.

When metal circuit 42 is calibrated to detect metal objects at a maximum depth sensitivity, metal objects close to the wall surface may seem to have a very wide width as indicated by sensor 10. To ascertain the true edges of the metal object being detected, sensor 10 may be placed at the approximate center of the indicated area and be re-calibrated for the appropriate depth of that specific metal object. Sensor 10 may then be re-scanned across that area from each side of the metal object, to locate the edges of that object.

Sensor 10 will detect live wires as sensor 10 is scanned across the structural surface being tested, provided live wire switch 14 is in the "ON" position, and ON-OFF switch 12 is pressed momentarily at the beginning of scanning. No specific calibration is required for detecting live wires. When a live wire is detected, sensor 10 will sound triple short beeps, a green LED 30 will be illuminated and all red LEDs will flash in a rotating pattern. The live wire indication, as described, will override both wood and metal indications. Note that shielded live wires contained in metal conduits, casings, or behind metallized walls or thick, dense walls, will not be detected by live wire circuit 44.

Sensor 10 further comprises extending "horn" portions 17 at either side of resilient marker member 18. Each horn portion 17 comprises an inner surface 17' which is spaced precisely ⅞ inches from the center axis of sensor 10, which coincides with pin marker 20 or pencil hole 22. This facilitates the prompt location of the center of a standard wood stud which is 1 and ¾ inches in width. The user may simply mark the center point of the stud on the wall surface by using the inner surface 17' of the extending horn portion 17 as a guide.

Figure 1C:
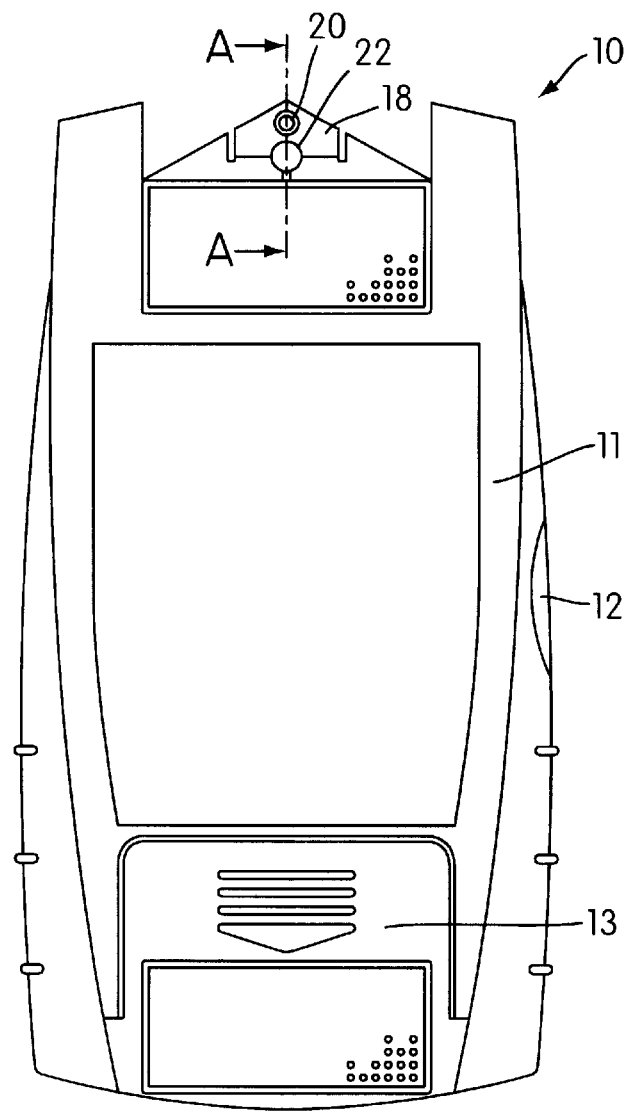
FIG. 1C is a bottom view of the illustrated sensor.

FIG. 1C provides a view of the bottom of sensor 10, which is the side of sensor 10 which comes in contact with the surface being scanned. As shown in FIG. 1C, hidden object sensor 10 comprises an outer housing, which includes a substantially planar contact surface 11 which will come in direct contact with the surface being scanned. A removable battery (not shown) for powering the device's circuitry may be accessible via a battery door 13.

Figure 1D:
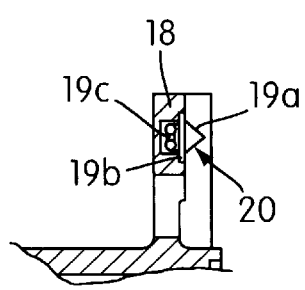
FIG. 1D provides a partial cross-sectional view of the sensor-taken along the lines A—A as depicted in FIG. 1C.

The view shown in FIG. 1C shows the bottom side of resilient marker member 18, including pin marker 20 and pencil hole 22. FIG. 1D shows a partial cross-sectional view of hidden object sensor 10, illustrating a cross section of resilient marker member 18 along the lines A—A. As shown in FIG. 1D, pin marker 20 may comprise a metallic scribe inserted into a recess of resilient marker member 18. The metallic scribe may comprise, for example, a brass insert having an apex portion 19a, a flange 19b and a cylindrical insert portion 19c which may comprise threads or may be fastened to the recess provided within resilient marker member 18 by glue or cement or by another process, such as insert molding. The recess provided within resilient marker member 18 is of a shape to accommodate both the cylindrical protruding portion 19c as well as flange portion 19b of the metallic insert.

Figure 4:
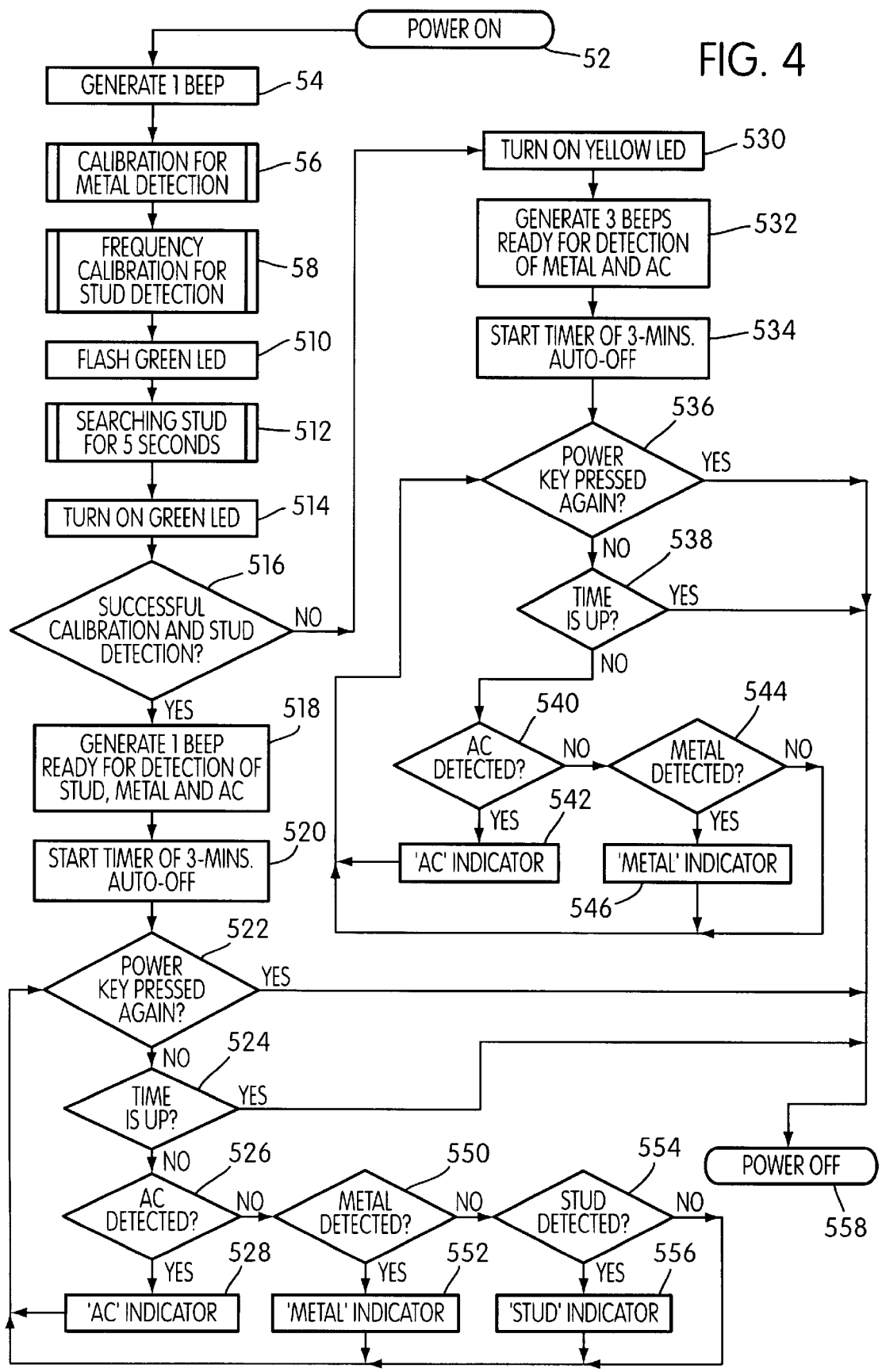
FIG. 4 is a flowchart representing the process by which the illustrated hidden object sensor 10 will perform its various functions.

FIG. 4 illustrates the process performed by the sensing circuitry 60 shown in FIG. 3, as controlled by microprocessor 52. At an initial step S2, the process will commence upon powering on of sensor 10 by depressing switch 12. The sensor will then generate one beep in step S4, and calibration will be commenced for metal detection as indicated at step S6.

Frequency calibration will occur within wood circuit 48 at step S8, and upon commencement of both the metal detection calibration and stud detection calibration, microprocessor 52 will cause the green LED to be flashed, as indicated at step S10. At step S12, microprocessor 52 will allow wood circuit 48 to search for a stud for up to 5 seconds. At that point, as indicated at step S14, the green LED will be constantly illuminated.

At step S16, a determination is made as to whether wood circuit 48 has successfully calibrated itself for stud detection. If not, the process will proceed to step S30, where the yellow LED will be illuminated indicating that sensor 10 is in a metal-only detection mode. If wood circuit 48 did successfully calibrate itself to detect studs, the process will proceed to step S18, at which point microprocessor 52 will cause a single beep to be generated by the audible indicator 54, thereby signaling that sensor 10 is ready to detect studs, metal objects, and live wires. At step S20 a timer will commence. At step S22, a determination is made as to whether ON-OFF switch 12 has been pressed again. If it has, the process will be forwarded to step S58 at which point microprocessor 52 will shut sensor 10 off. If the ON-OFF switch (i.e., the power key) has not been pressed again, the process will proceed from step S22 to step S24, where a determination is made as to whether the 3 minutes of time set at step S20 has expired. If such time has expired, the process will proceed to step S58.

If the three minutes have not expired, the process will proceed to step S26, where microprocessor 52 will inquire as to whether an AC voltage of a sufficient level has been detected by live wire circuit 44. If such a voltage level has been detected, the process will proceed to step S28 where the appropriate AC indications will be triggered via visible indicator 50 and audible indicator 54. The process will then return to step S22. Note the process will not be forwarded to step S50 if an AC (live wire) indication is generated, as the device is designed so that it will not identify the existence and location of a metal object or a stud where a live wire exists. This serves as a safety precaution to prevent the user from proceeding to insert a nail or screw into a detected metal object or stud that may coincide in position with the detected live wire. Only if there is no AC voltage detection as determined at step S26 will the process proceed to step S50 and then inquire as to whether a metal object has been detected by metal circuit 46.

If a metal object has been detected by metal circuit 46, the process will proceed to step S52 where a metal indication will be triggered by microprocessor 52 via visible indicator 50 and audible indicator 54 in accordance with the process as described above. While a metal indication is taking place, and a metal object has been detected by sensor 10, the process will not proceed to detect a stud using wood circuit 48, and thus will not return to step S54 until and unless there has been no detection of an AC voltage at step S26 and there has been no detection of a metal object at step S50. When a metal object has been detected, the sensor 10 will identify the fact that the object is metallic by generating short double beeps with the audible indicator, flashing the green LED, and steadily illuminating the red LEDs. To indicate a detected wood stud a short repeating beep is generated while using the same audible indicator steadily illuminating the same green LED and the same red LEDs. If the process proceeded to determine if a stud was detected at step S54, wood circuit 48 would also provide an indication of the presence of an object behind the tested surface, as wood circuit 48 uses a capacitive sensor which may very well sense metal objects as well as wood objects. This would unnecessarily create confusion, and would require that a separate indicator such as a separate row of LEDs be provided for purposes of simultaneously indicating that a stud exists as detected by the capacitive sensor used by wood circuit 48.

To cut down on the cost of providing extra indicators and LEDs and to cut down on the confusion encountered by the user, the device of the illustrated embodiment is simplified. It includes only one set of indicators for identifying hidden objects, and detects for hidden objects in accordance with an intelligent hierarchy. That hierarchy prioritizes the information provided to the user so that the user is only provided with the most pertinent and meaningful information at any given time. Thus, if an AC voltage is detected, information will not be provided regarding the location of a metal or wooden object hidden behind the tested surface. The user only needs to concern his or herself with the fact that there is a live wire behind the tested surface.

If there is no live wire behind the tested surface, the sensor 10 may indicate the existence and location of a metal object behind the tested surface via processing at step S50 and step S52. If that is the case, the presence and location of that metal object will be identified by the audible indicator and the single set of LEDs 24 using a specific protocol—with the green LED flashing, the red LEDs on and the audible indicator providing short double beeps. The device will automatically avoid checking to see whether there is a wooden stud where the device is already indicating the existence and location of a metal object. The user need not be concerned with whether or not a non-metallic object coincides with the metallic object that has been detected.

If there is no live wire or metal object detected at either step S26 or S50, the process will proceed to step S54 and check for the existence and the location of a stud with the use of wood circuit 48. If a stud is located, the appropriate indication protocol will be triggered at step S56, thus causing the red LEDs to be illuminated, and a short repeating beep, and the illumination of a green LED to commence upon the coinciding of sensor 10 with the stud edge.

Before sensor 10 will commence the detection and location of objects behind a tested surface, it will perform a calibration for metal detection as well as a calibration for stud detection at steps S6 and S8. To further simplify the operation of the device and the user's understanding of the types of objects behind the tested surface, the device will indicate as a result of that initial calibration when there are no non-metallic objects detected behind the tested surface, and the device will automatically enter into a metal-only sensing mode. When sensor 10 is in this mode, a yellow LED 26 will be illuminated at step S30, and three beeps will be generated by audible indicator 54 indicating that the device is ready to detect metal objects and live wires behind the tested surface, and that the device will not concern itself with non-metallic objects, as no such non-metallic objects appear to be present. At step S34 a three minute timer will be commenced. At step S36 a determination is made as to whether the power key has been pressed. If it has, the process will proceed to step S58, and sensor 10 will be shut off. If the power key was not pressed, the process will proceed to step S38 where a determination is made as to whether three minutes have expired. If the three minutes have expired, the process proceeds to step S58. If not, the process proceeds to step S40, where a determination is made as to whether live wire circuit 44 has detected a live wire. Here, the hierarchy is set up so that if a live wire is detected, the appropriate indication protocol is triggered by microprocessor 52 at step S42, and the process will return to step S36. Only if no live wire is detected at step S40, will the process proceed to step S44, at which point metal circuit 46 will try to detect and locate a metal object. Upon the detection and location of a metal object, the appropriate indication protocol will be triggered by microprocessor 52 at step S46.

While the invention has been described by way of an exemplary embodiment, it is understood that the words which have been used herein are words of description, rather than words of limitation. Changes may be made within the purview of the appended claims, without departing from the scope and spirit of the invention in its broader aspects. Although the invention has been described herein with reference to particular elements, materials and embodiments, it is understood that the invention is not limited to the particulars disclosed. The invention extends to all equivalent structures, mechanisms, elements and uses which are within the scope of the appended claims.

What is claimed is:

1. A hand-held hidden object sensor for sensing a location of objects hidden behind a surface of an architectural structure, said sensor comprising:

an indicator for indicating a location of first and second object types hidden behind a surface;

sensing circuitry for sensing said first and second object types hidden behind said surface of said architectural structure;

an indication activation mechanism for causing the indication by said indicator of the location of said first object type as sensed by said sensing circuitry and precluding a concurrent indication of said second object type;

and a housing supporting said indicator, said sensing circuitry, and said indication activation mechanism.

2. The hand-held hidden object sensor of claim 1, wherein said first object type comprises a live wire carrying 110 or 220 Volts AC and said second object type comprises a metallic or non-metallic object.

3. The hand-held hidden object sensor according to claim 1, wherein said first object type comprises a metallic object and said second object type comprises a non-metallic object.

4. The hand-held hidden object sensor according to claim 1, wherein said indicator comprises a visible indicator and an audible indicator, said visible indicator comprising an array of light emitting elements, said audible indicator comprising a tone generator.

5. The hand-held hidden object sensor according to claim 1, wherein said sensing circuitry comprises a live wire circuit for sensing live wires carrying at least 110 or 220 Volts AC, a metal circuit for sensing metal objects, and a wood circuit for sensing wood objects;

said hand-held hidden object sensor further comprising a calibration activation mechanism for causing the calibration of said metal circuit and said wood circuit, said calibration activation mechanism deactivating said wood circuit when said wood circuit is not successfully calibrated, said indication activation mechanism causing the indication by said indicator of a "metal-only" indication when said wood circuit is deactivated.

6. The hand-held hidden object sensor according to claim 1, wherein said first object type comprises live wires carrying 110 or 220 Volts AC, and said sensor further comprising a live wire deactivating mechanism for bypassing the sensing and indication of said live wires where the user anticipates static electricity accumulating on said surface of said architectural structure and knows said architectural structure is devoid of live wires.

7. The hand-held hidden object sensor according to claim 1, wherein said indicator is further capable of indicating the location of a third object type.

8. The hand-held hidden object sensor according to claim 7, wherein said first object type comprises a live wire, said second object type comprises metal, and said third object type comprises a non-metallic object.

9. A method for sensing and locating objects hidden behind a surface of an architectural structure, using a hand-held hidden object sensor, said method comprising:

sensing for first and second object types hidden behind said surface of said architectural structure; and indicating a location of said first object type sensed; and precluding a concurrent indication of said second object type.

10. The method according to claim 9, wherein said first object type comprises a live wire carrying 110 or 220 Volts AC and said second object type comprises a metallic or non-metallic object.

11. The method according to claim 9, wherein said first object type comprises a metallic object and said second objects type comprises a non-metallic object.

12. The method according to claim 9, wherein said indication of the presence and location of said first or second object types causes the illumination of an array of light emitting elements and the generation of a tone.

13. The method according to claim 9, further comprising causing the calibration of a metal circuit and a wood circuit, each provided within said sensor, and deactivating said wood circuit when said wood circuit is not successfully calibrated and causing the indication of a "metal-only" indication when said wood circuit is deactivated.

14. The method according to claim 9, further comprising deactivating a live wire circuit to bypass the sensing and indication of live wires carrying 110 or 220 Volts AC where a user anticipates problems with static electricity accumulating on said architectural surface and knows said architectural surface is devoid of live wires.

* * * * *